United States Patent [19]
Tanimura et al.

[11] Patent Number: 5,109,703
[45] Date of Patent: May 5, 1992

[54] VORTEX FLOW METER

[75] Inventors: Yoshihiko Tanimura, Kyoto; Yasuo Tada; Katsuaki Yasui, both of Hyogo, all of Japan

[73] Assignees: Mitsubishi Denki K.K.; Mitsubishi Jidosha Kogyo K.K., both of Tokyo, Japan

[21] Appl. No.: 570,496

[22] Filed: Aug. 21, 1990

[30] Foreign Application Priority Data

Aug. 21, 1989 [JP] Japan ................................ 1-215305

[51] Int. Cl.$^5$ .............................................. G01F 1/38
[52] U.S. Cl. .................................................. 73/861.22
[58] Field of Search ............ 73/861.27, 861.23, 861.24

[56] References Cited

U.S. PATENT DOCUMENTS

| 3,927,566 | 12/1975 | Zanker | 73/861.22 |
| 4,307,619 | 12/1981 | Herzl | 73/861.24 |
| 4,735,094 | 4/1988 | Marsh | 73/861.24 |
| 4,891,990 | 1/1990 | Khalifa et al. | 73/861.24 |

FOREIGN PATENT DOCUMENTS

| 3725 | 2/1979 | Japan. |
| 100026 | 6/1985 | Japan. |
| 4808 | 2/1986 | Japan. |

*Primary Examiner*—Herbert Goldstein
*Attorney, Agent, or Firm*—Sughrue, Mion, Zinn Macpeak & Seas

[57] ABSTRACT

A Karman vortex generating member is made integral with a sensor portion and supported elastically by a wall of a fluid conduit through a pair of elastic holding members so that externally produced pressure is prevented from being transmitted to the sensor portion.

3 Claims, 3 Drawing Sheets

/ 1

VORTEX FLOW METER

BACKGROUND OF THE INVENTION

The present invention relates to a vortex flow meter.

U.S. Pat. No. 4,891,988 assigned to the assignee of this application discloses a vortex flow meter using a pressure sensor.

Japanese Utility Model Publication No. 54-3725 discloses a pressure difference detection of Karman vortex in which a pair of pressure conducting holes and a pair of detection chambers are provided and the detection chambers are separated from each other by a pair of pressure difference detecting elements.

Japanese Utility Model Publication No. 61-4808 discloses a use of a pair of diagphrams to prevent an erroneous operation of a flow meter due to vibration of the diagphrams.

Japanese Kokai (P) 60-100026 discloses a pressure sensor in which a pair of diaphragms are arranged differentially to remove residual distorsion applied to the diagphrams.

Japanese Kokai (U) 59-180625 or Japanese Kokai (U) 63-36851 discloses another typical example of a conventional vortex flow meter. The vortex flow meter shown in either of them comprises a vortex generating post, a pair of movable partitions capable of being deviated by vortex generated by the vortex generating post, two pairs of detectors for detecting deviations of these movable partitions as complementary electric variations and a bridge circuit including these detectors.

In the vortex flow meter constructed as mentioned above, a Karman vortex sensor portion is provided integrally with a conduit and, therefore, a pressure distorsion such as vibration or mechanical shock exerted on the conduit may be transmitted to a cavity in which a pressure sensor is formed, causing the cavity to be distorted slightly. Such small distorsion of the cavity is transmitted through a medium, i.e., air, to the movable partitions, i.e., diagphrams, resulting in an erroneous output from the bridge circuit.

SUMMARY OF THE INVENTION

An object of the present invention is to provide a vortex flow meter having an improved measuring sensitivity by preventing pressure distorsion from being applied from a fluid conduit to a pressure sensor.

According to the present invention, a vortex flow meter includes a sensor portion composed of a vortex generating member for generating Karman vortexes and a pressure sensor formed integrally with the vortex generating member and adapted to be deformed by Karman vortex pressure to produce an output. The sensor portion is mounted on a fluid conduit through a holding member of elastic material.

The holding member serves to absorb pressure caused by vibration and/or shock transmitted through the fluid conduit to thereby prevent such pressure from transmitting to the sensor portion.

DETAILED DESCRIPTION OF THE PREFERRED EMBODIMENTS

An embodiment of the present invention will be described with reference to the drawings.

Figure 1:
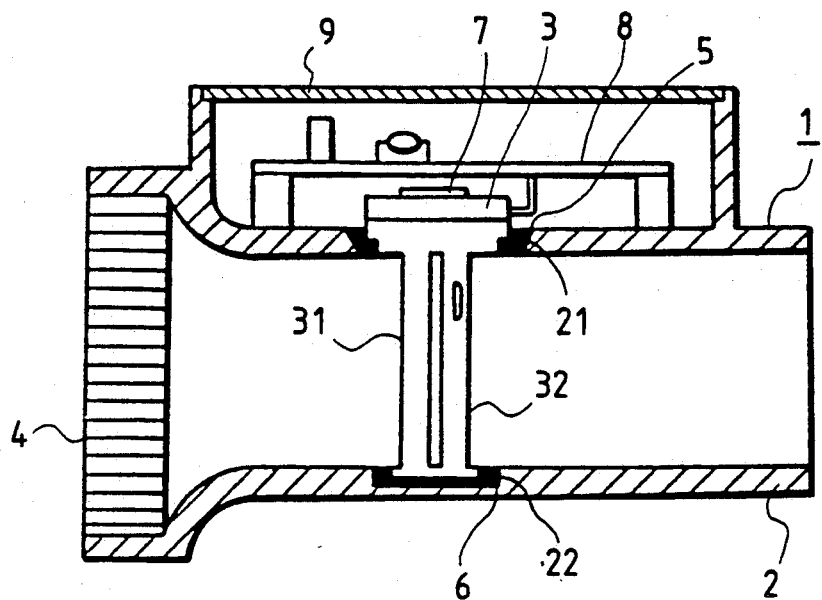
FIG. 1 is a cross section of a vortex flow meter according to an embodiment of the present invention.

In FIG. 1 which shows a vortex flow meter 1 in cross section, it includes a conduit 2 through which fluid to be measured flows and a sensor portion 3 having opposite end portions supported through a first and a second holding members 5 and 6 by a wall of the conduit 2, respectively.

The sensor portion 3 includes a vortex generating member 31 and a sub-vortex generating member 32 both arranged across the conduit 2. Straightening vanes 4 are provided in an upstream of the conduit 2 for establishing smooth fluid flow therein. The sensor portion 3 is fixedly mounted by means of a pressure plate 7. A control circuit 8 is connected to a sensor of the sensor portion 3. This will be described with reference to FIG. 2. The sensor portion 3 and the control circuit 8 are protected by a protection cover 9.

Figure 2:
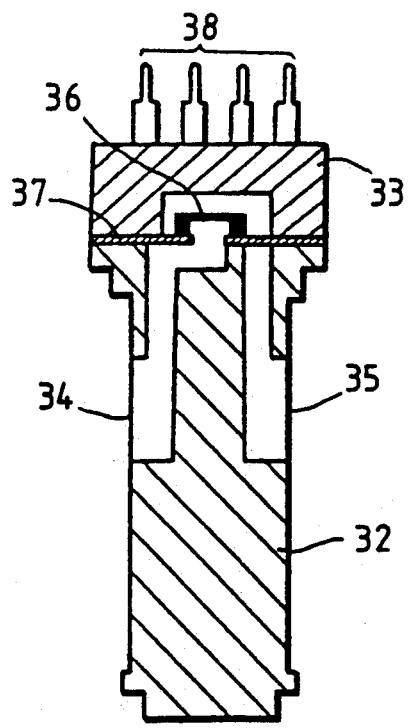
FIG. 2 is a cross section of a sensor portion of the vortex flow meter shown in FIG. 1.

FIG. 2 is a vertical cross section of the sensor portion 3 integrally fixed to the sub-vortex generating member 32. The sub-vortex generating member 32 is formed therein with a first and a second pressure detecting holes 34 and 35 for conducting Karman vortex pressures to opposite sides of a pressure sensor 36 disposed in a chamber formed in a sensor cap 33 and communicated with the second pressure detecting hole 35. The sensor 36 is supported sealingly by a partition wall 37 disposed between the sub-vortex generating member 32 and the sensor cap 33, such the sensor 36 receives on one side thereof pressure introduced by the first pressure detecting hole 34 and on the other side thereof pressure introduced through the second pressure detecting hole 35. The sensor 36 includes a four terminal, deformation resistance circuit 101 in the form of bridge, terminals of which are connected externally through lead terminals 38.

Figure 3:
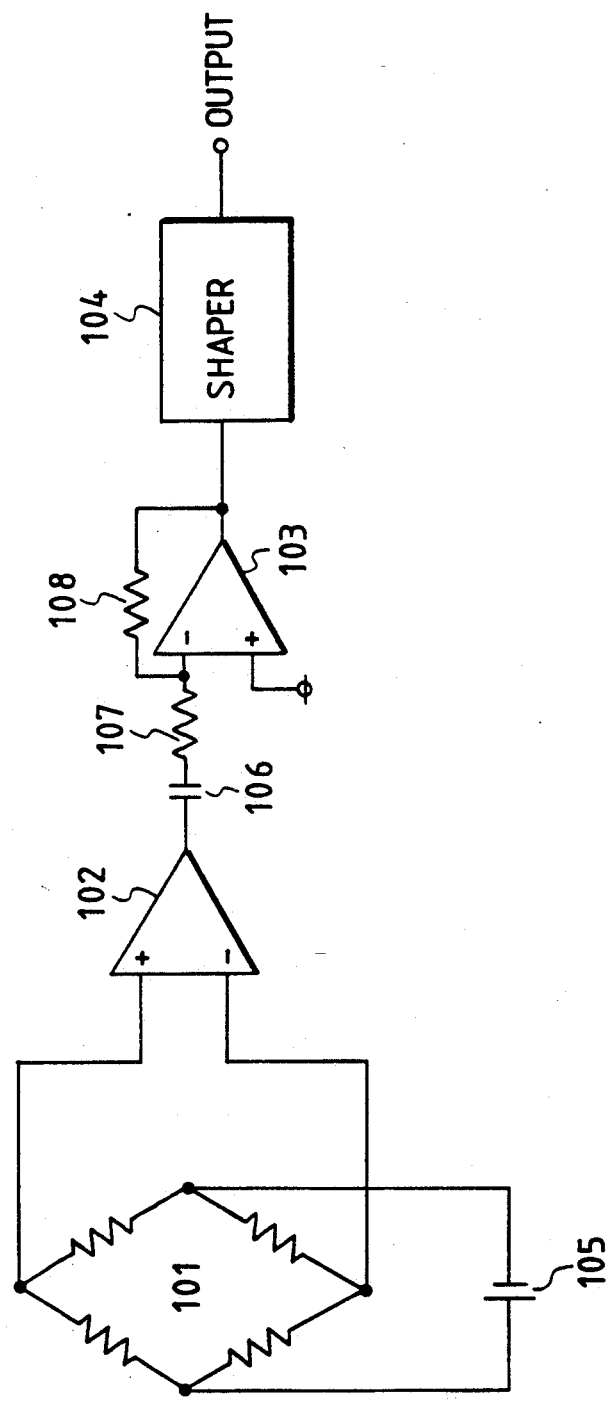
FIG. 3 is a circuit diagram of a control circuit of the present invention.

FIG. 3 shows a construction of the control circuit 8 connected to the deformation resistance bridge 101 having a d.c. power source 105 connected across opposite two terminals of the bridge. A differential amplifier 102 has two inputs connected to the remaining two terminals of the bridge circuit 101 and an output connected through a capacitor 106 and a resister 107 to a minus input of another differential amplifier 103 whose plus input is grounded. An output of the differential amplifier 103 is connected to an input of a wave shaper circuit 104 and also fedback to the minus input thereof through a resister 108.

Figure 4:
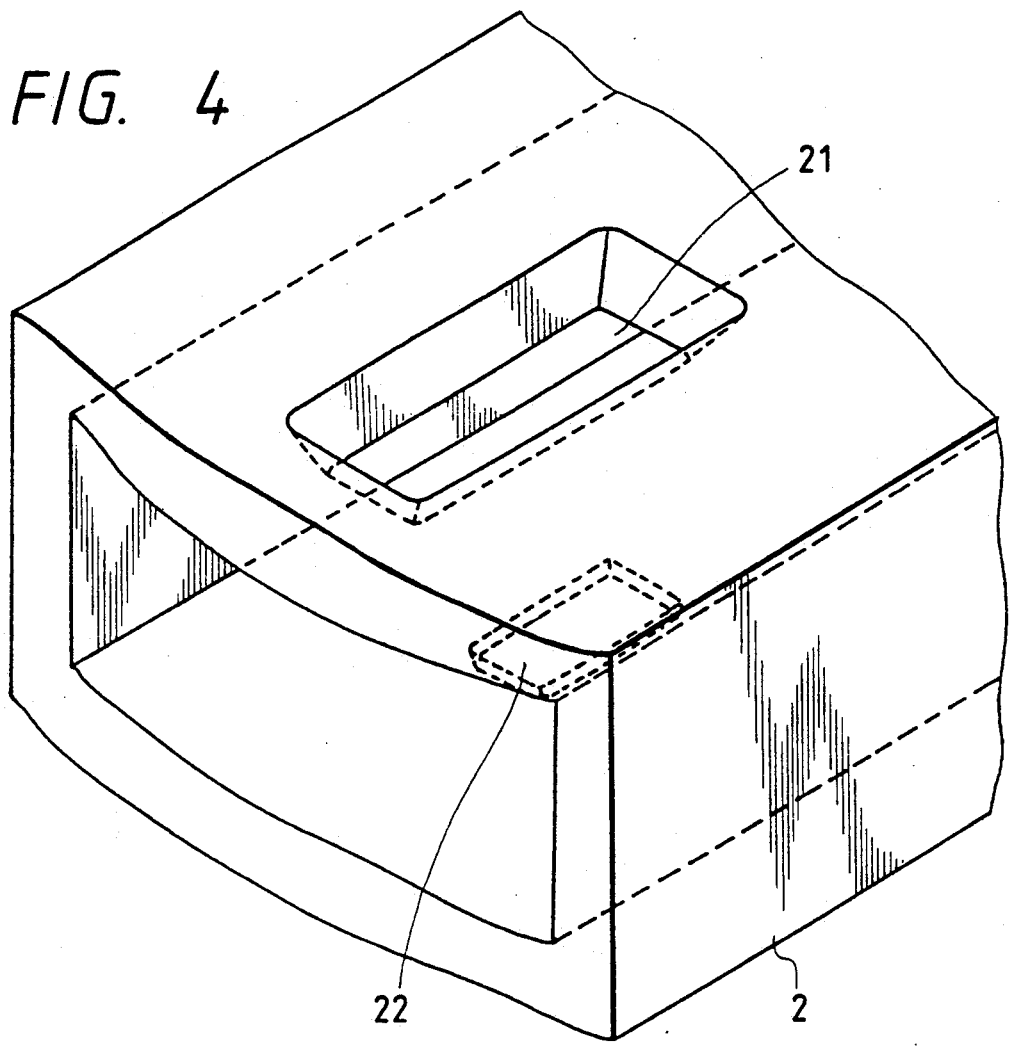
FIG. 4 is a perspective view of a main portion of a conduit according to the present invention.

The conduit 2 is formed in its wall at positions corresponding to the respective opposite end portions of the vortex generating member 32 with a through-hole 21 and a blind hole 22. FIG. 4 shows these holes 21 and 22 perspectively. The through-hole 21 is larger in size than the blind hole 22 so that the sensor portion 3 can be inserted through the through-hole 21 into the conduit 2.

Figure 5:
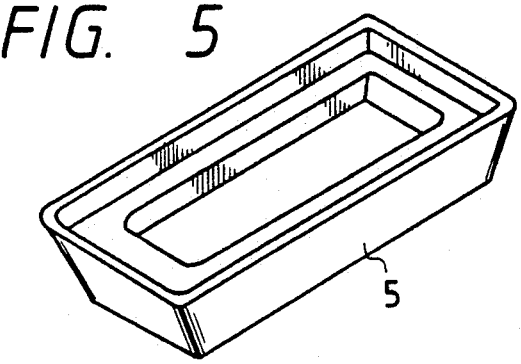
FIGS. 5 and 6 are perspective views of holding members according to the present invention, respectively.
Figure 6:
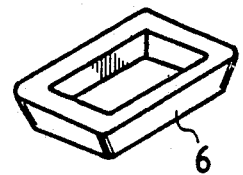

The elastic holding member 5 has an annular shape as shown in FIG. 5 and the holding member 6 in a dish shape as shown in FIG. 6. The holding members 5 and 6 are fitted in the respective holes 21 and 22 and elastically receive the upper and the lower ends of the sensor portion 3, respectively. The elastic material forming the holding members 5 and 6 may be silicon rubber.

In operation, the vortex generating members 31 and 32 generate Karman votexes when fluid flows in the conduit 2 through the straightening vanes 4. Vortex pressures are introduced through the pressure detecting holes 34 and 35 to the both sides of the pressure sensor 36. The deformation resistance circuit 101 formed on the sensor 36 is deformed by a pressure difference between the sensor sides and produces a potential difference correspondingly. The potential difference is amplified by the differential amplifier 102 and a d.c. component of the amplified signal is removed by the capacitor 106 and the resister 107 so that only a.c. component thereof is amplified by the differential amplifier 103. An output of the amplifier 103 is wave-shaped by the shaper circuit 104 into rectangular pulse form which is processed in the well known manner to provide an indication of flow rate of fluid in the conduit.

In this embodiment, the sensor portion 3 is supported by the conduit 2 through the elastic holding members 5 and 6 with an aid of the pressure plate 7. Therefore, any pressure produced in the conduit 2 by external force is absorbed by the holding members 5 and 6 and thus a transmission of such pressure to the sensor portion 3 is prevented. Consequently, it is possible to increase the sensitivity of the sensor, causing the dynamic range thereof to be improved and causing a flow rate detection to be possible even when vortex pressure is very low.

What is claimed is:
1. A karman vortex flow meter, comprising:
   a vortex generating member disposed in a fluid conduit;
   a sensor portion including a pressure sensor integrally and fixedly secured to said vortex generating member for producing an output corresponding to a deformation of said pressure sensor caused by vortex pressure of Karman vortices produced by said vortex generating member, said sensor portion having a cross sectional area larger than that of said vortex generating member;
   a pair of elastic holding members for elastically supporting opposite ends of said integral assembly of said vortex generating member and said sensor portion, respectively, with respect to a wall of said conduit to thereby minimize the deformation force applied to said sensor portion from said conduit; and
   means for resiliently pressing said integral assembly against said elastic holding members to relatively rigidly support said assembly with said wall of said conduct.

2. The Karman vortex flow meter claimed in claim 1, wherein said wall of said conduit has a through-hole and a blind hole opposite to said through-hole and wherein said elastic holding members are fitted in said through-hole and said blind hole, respectively.

3. The Karman vortex flow meter claimed in claim 2, wherein said holding members are of silicon rubber.

* * * * *